(12) United States Patent
Liu (10) Patent No.: US 9,381,648 B1
(45) Date of Patent: Jul. 5, 2016

(54) DEVICE FOR DRIVING MECHANICAL GRIPING JAWS

(71) Applicant: HIWIN TECHNOLOGIES CORP., Taichung (TW)

(72) Inventor: Jonus Liu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 14/802,454

(22) Filed: Jul. 17, 2015

(30) Foreign Application Priority Data

Mar. 25, 2015 (TW) .............................. 104109527 A (51) Int. Cl.
  *B66C 1/00* (2006.01)
  *B66C 1/42* (2006.01)
  *B25J 15/00* (2006.01)

(52) U.S. Cl.
  CPC .................................. *B25J 15/0028* (2013.01)

(58) Field of Classification Search
  CPC .. B25J 15/103; B25J 15/0028; B25J 15/0009; A61F 2/583; H01L 21/68707
  See application file for complete search history.

(56) References Cited

U.S. PATENT DOCUMENTS

| 5,280,981 | A | * | 1/1994 | Schulz | B25J 15/103 294/106 |
| 5,762,390 | A | * | 6/1998 | Gosselin | B25J 15/103 294/106 |
| 6,505,870 | B1 | * | 1/2003 | Laliberte | B25J 15/103 294/106 |
| 6,669,257 | B2 | * | 12/2003 | Laliberte | B25J 15/103 192/34 |

* cited by examiner

*Primary Examiner* — Stephen Vu
(74) *Attorney, Agent, or Firm* — Muncy, Geissler, Olds & Lowe, P.C.

(57) ABSTRACT

A device for driving mechanical griping jaws includes a first board; a screw connected to the first board; a second board connected to the screw and having slots; a driving board mounted around the screw; linkages each having: a first link with a first axis and a second axis, wherein the first axis is pivotally connected to the second board, and a second link with a third axis, a fourth axis and a fifth axis, wherein the third axis is pivotally connected to the driving board, and the fourth axis is pivotally connected to the second axis; connecting boards each being pivotally connected to the fifth axis and passing the corresponding slot; and linear movement modules each having a slide rail and a slider moving along the slide rail and being connected to the connecting board, so as to precisely position the griping jaws and eliminate griping errors.

6 Claims, 8 Drawing Sheets

DEVICE FOR DRIVING MECHANICAL GRIPING JAWS

BACKGROUND OF THE INVENTION

1. Technical Field

The present invention relates to end effectors for robot arms, and more particularly to a device for driving mechanical griping jaws to grip articles.

2. Description of Related Art

With the progress of technology, robot arms have been increasingly widely used in various working occasions for replacing manual operation. Especially, in poor working environments, the use of robot arms helps to reduce the risk of process accidents and to protect workers from health threats. For instance, robot arms are perfect to perform welding operation can generate gases, high temperature and blaze that may otherwise hurt workers' respiratory system, burn workers' skin and cause accelerated aging of workers' eyes.

In practical applications of robot arms, the use of end effectors that are designed for specific physical functions is necessary to generate desired physical effects. For example, an end effector designed for operating a gripper to grip an article and moving the article to a different place can provide the physical effect of displacement.

The conventional grippers typically use parts like gears and racks to drive their griping jaws but provide no guiding structure for the movement of the griping jaws. Such a gripper grips or releases an article only depending on making its plural griping jaws come close to each other or leave away from each other by means of gears and racks. However, transmission realized by gears and racks tends to lack precision in terms of positioning the griping jaw. Besides, since the griping jaws are not properly guided, they are likely to move under external force, increasing the risk of errors and falls during griping operation.

Additionally, there are swing links designed for control griping jaws in known grippers. However, such a gripper has its gripping level changing with the distance among its griping jaws, and this makes its gripping operation difficult, especially when gripping thin workpieces. There are also grippers using horizontal swing links to control griping jaws thereof, but they similarly have the problem that the gripping level can change with the distance among the griping jaws. For addressing this problem, a wedge hook has been developed for grippers by whom an external force moving in the axial direction can drive the griping jaws to move in the redial direction. Since the redial movement of the griping jaws is realized by push among their ramps, the problem that the gripping level changes with the distance among the griping jaws can be eliminated. However, such a configuration works on a component of the axial movement that drives the redial movement, so the force applied to make the axial movement has to be greater than the force applied to make the redial movement, and the griping force applied by the gripping jaws is necessarily smaller than the force applied axially. This causes waste of energy that is used to achieve the axial force application.

SUMMARY OF THE INVENTION

In view of the shortcomings of the prior art, the present invention provides a device for driving mechanical griping jaws, which features for more precise positioning of griping jaws and reduce the risk of errors and falls during the griping operation of the gripping jaws.

For achieving the foregoing primary objective, the present invention provides a device for driving mechanical griping jaws, which comprises: a screw, having a first segment and a second segment, wherein the first segment is connected to the first board; a second board, being connected to the second segment and having a plurality of slots; a driving board, having a nut portion that is mounted around the screw and when driven by the screw drives the nut portion to move; a plurality of linkages, each having: a first link whose two ends are defined with a first axis and a second axis, respectively, wherein the first link is pivotally connected to the second board at the first axis; and a second link, being defined with a third axis, a fourth axis, and a fifth axis, wherein the second link is pivotally connected to the driving board at the third axis, and the second link is pivotally connected to the second axis of the first link at the fourth axis; a plurality of connecting boards, each being pivotally connected to the second link at the fifth axis and correspondingly passing through the corresponding slot; and a plurality of linear movement modules, each having a slide rail and a slider, wherein the slide rails are distributed over the second board in radial directions of the screw, and the sliders are mounted on the slide rails to be limited to move along the slide rails and are connected to the connecting board. Thereby, the screw drives the nut portion, and then the linkage drives the slider to move along the slide rail, so as to precisely position the griping jaws to grip an article and reduce the risk of errors and falls.

In addition, the first axis, the second axis, and the third axis form a first included angle. The first axis, the second axis, and the fifth axis form a second included angle. The first included angle and the second included angle are supplementary.

In addition, the first axis and the second axis are spaced by a first distance. The third axis and the fourth axis are spaced by a second distance. The fourth axis and the fifth axis are spaced by a third distance. The first distance, the second distance, and the third distance are equal to each other. It is thereby possible to drive the slider connected to the fifth axis and the griping jaws thereon to move in the slide rail along the redial direction of the screw, so as to prevent the gripping level from changing with the distance among the griping jaws.

Moreover, when the first included angle is smaller than the second included angle, the average velocity at which the third axis moves in the axial direction of the screw is smaller than the average velocity at which the fifth axis moves in the redial direction of the screw, and the force applied on the fifth axis is greater than the force received at the third axis, so as to remedy the problem of reduced force application.

At last, when the first included angle is greater than the second included angle, the average velocity at which the third axis moves in the axial direction of the screw is greater than the average velocity at which the fifth axis moves in the redial direction of the screw, so that the average velocity at which the fifth axis moves in the redial direction of the screw is smaller than the average velocity at which the third axis moves in the axial direction of the screw.

DETAILED DESCRIPTION OF THE INVENTION

It is to be stated first that the term "axis" used herein is an imaginary axis, upon which links rotate against the axes at their pivotal connections. Additionally, as mentioned herein, the phrase "substantially parallel" refers to a parallel relation that may have slight deviation from its exact definition caused by processing errors that are small enough to not to break the parallel relation of the movement of the entire structure.

Referring to FIG. 1 to FIG. 7, according to one embodiment of the present invention, a device for driving mechanical griping jaws comprises: a first board 10, a screw 20, a second board 30, a driving board 40, a plurality of linkage 50, a plurality of connecting board 70, and a plurality of linear movement modules 80.

The screw 20 has a first segment 21 and a second segment 22 that are opposite to each other. The first segment 21 is connected to the first board 10. It is to be noted that, in the present embodiment, the screw is driven by a driving unit 60 deposited on the first board 10. The driving unit 60 includes a motor 61, a big pulley 62, a small pulley 63, and a belt 64. The motor 61 rotates the small pulley 63 and in turn drives the big pulley 62 through the belt 64, so as to amplify the torque of the motor 61 which is then used to drive the screw 20 fixedly connected to the big pulley 62 to rotate.

The second board 30 is connected to the second segment 22 of the screw 20. The second board 30 has a plurality of slots 31 that are arranged in the redial direction of the screw 20.

The driving board 40 is such installed between the first board 10 and the second board 30 that it can move under external force. In the present embodiment, the driving board 40 has a nut portion 41 that is mounted around the screw 20, so as to be driven to move when the screw 20 rotates to drive the nut portion 41.

Each of the linkage 50 has a first link 51 and a second link 52.

The first link 51 has two ends defined with a first axis 511 and a second axis 512, respectively. The first link 51 is pivotally connected to the second board 30 at the first axis 511. The second link 52 is defined with a third axis 521, a fourth axis 522, and a fifth axis 523 in order. The second link 52 is pivotally connected to the driving board 40 at the third axis 521. The second link 51 is pivotally connected to the second axis 512 of the first link 51 at the fourth axis 522. The fifth axis 523 is for an external article to be connected thereto.

Each of the connecting board 70 is pivotally connected to the second link 52 at the fifth axis 523, and passes through the corresponding slot 31.

Each of the linear movement modules 80 has a slide rail 81 and a slider 82. The slide rails 81 are distributed over the second board 30 in the redial direction of the screw 20. The slider 82 is mounted on the slide rail 81 and is limited to move along the slide rail 81 and is connected to the connecting board 70. In the embodiment, the griping jaws 90 are installed on the slider 82 and move with the slider 82. When the griping jaws 90 receive external force, the force acts on the linear movement module 80, so as to prevent the external force form acting on the linkage 50 through the connecting board 70. Thereby, the linkage 50 is protected from overload and damage, and the griping jaws 90 installed on the slider 82 can have precise movement in the redial direction of the screw 20.

Thereby, the disclosed device uses the screw 20 to drive the nut portion 41 of the driving board, and this way is more precise than the known approach where transmission is achieved by gears and racks. Moreover, the interaction between the slide rail 81 and the slider 82 of the linear movement module 80 helps to prevent the griping jaws 90 from deviation under external force, and ensure precise positioning of the griping jaws 90, thereby reducing the risk of errors and falls during griping operation.

Figure 1:
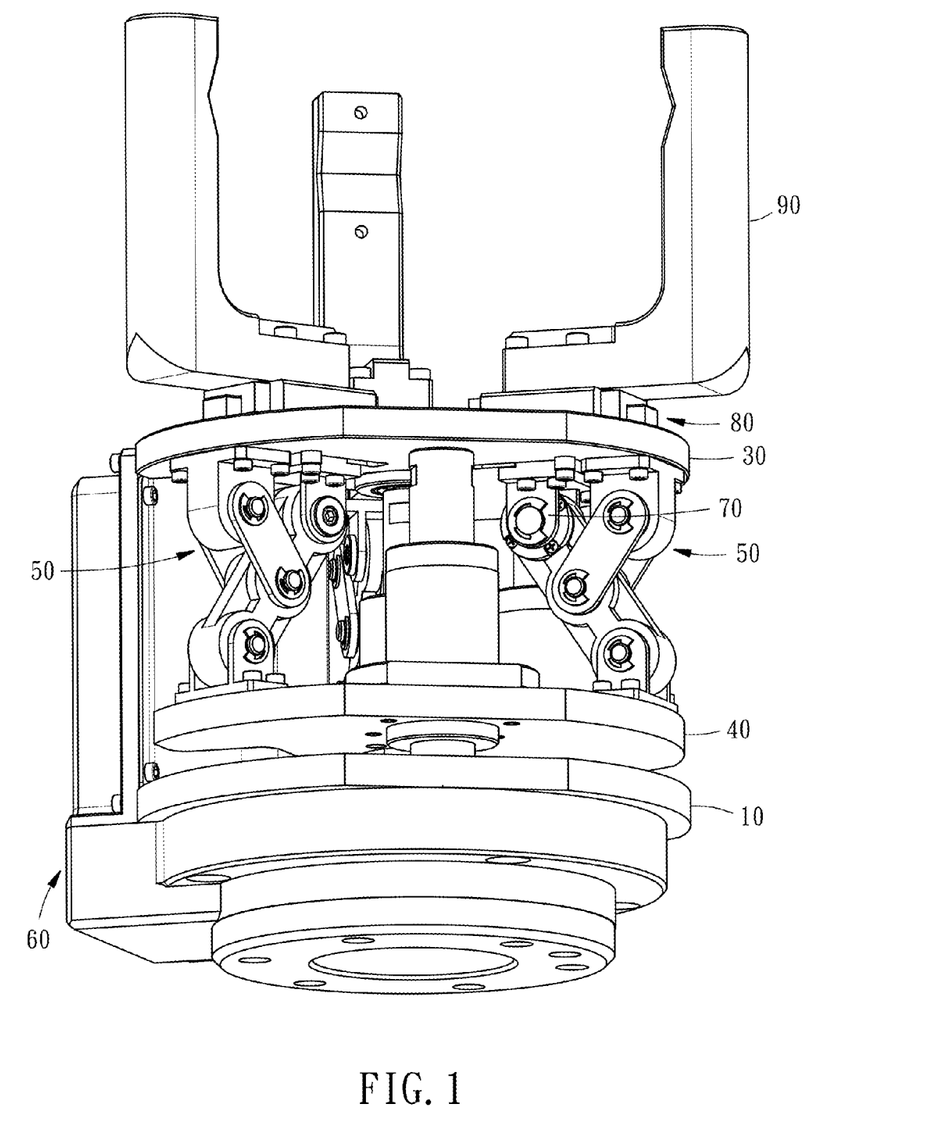
FIG. 1 is a perspective view of one embodiment of the present invention.
Figure 2:
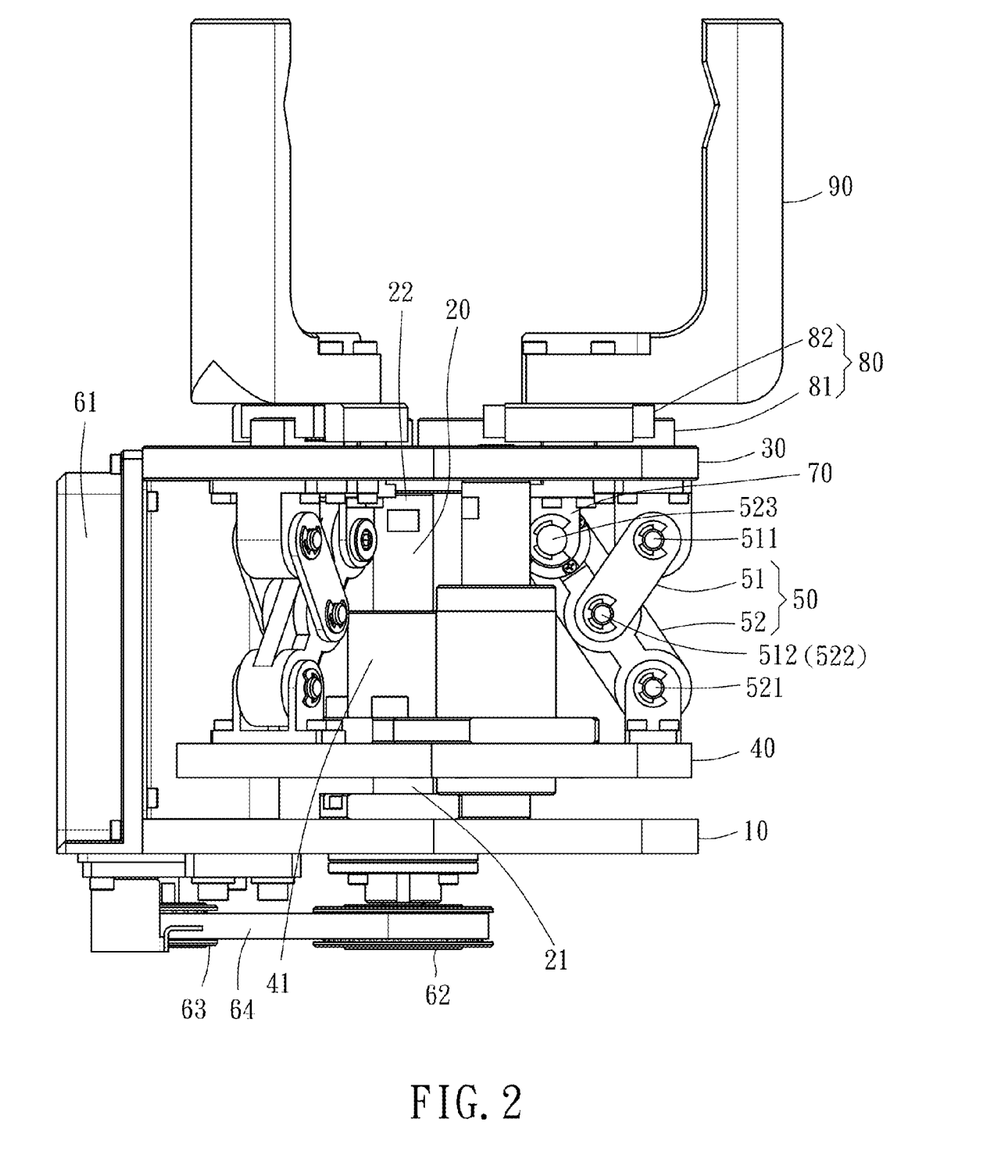
FIG. 2 is a left side view of the embodiment of the present invention.
Figure 3:
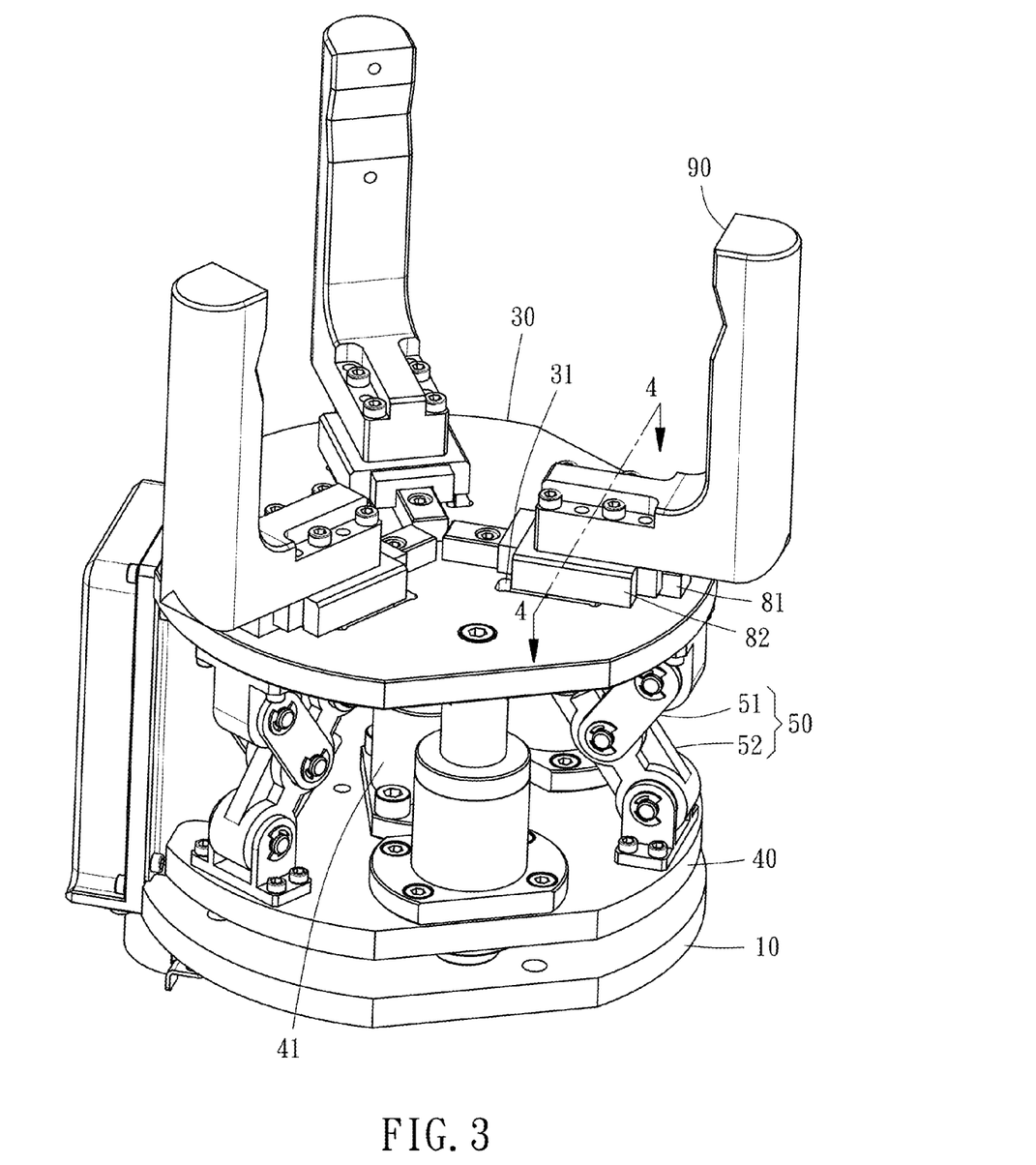
FIG. 3 is another perspective view of the embodiment of the present invention.
Figure 4:
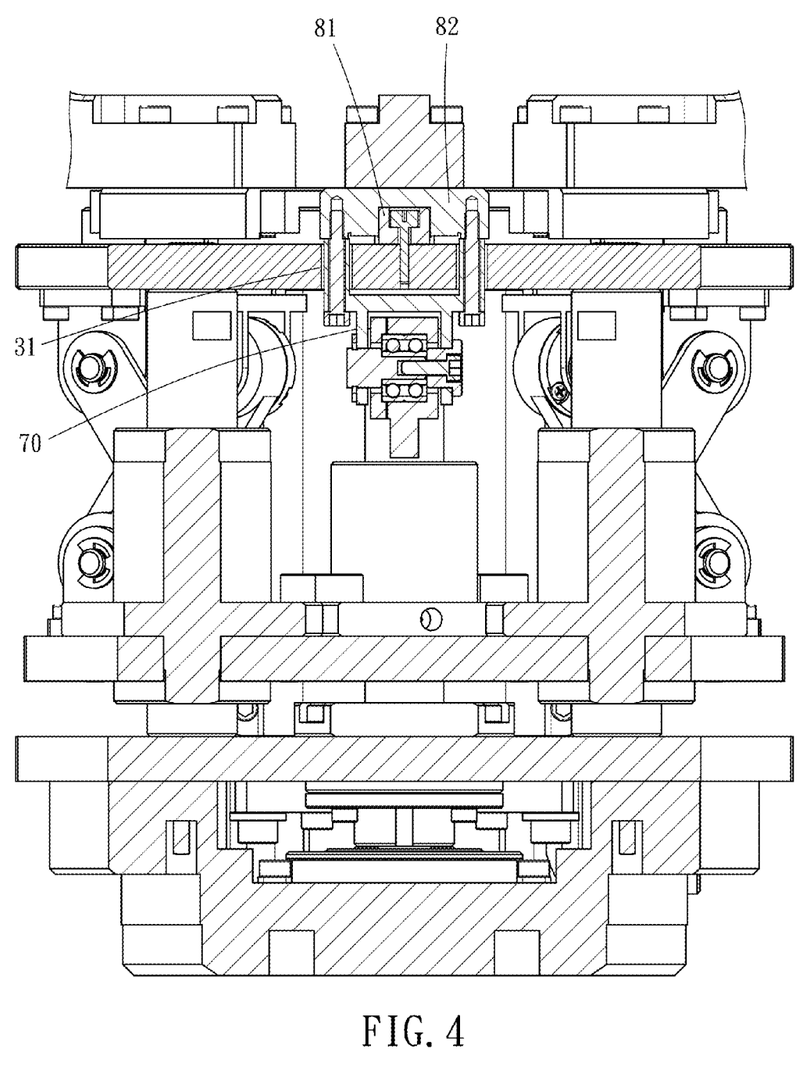
FIG. 4 is a cross-sectional view of the embodiment taken along Line 4-4 of FIG. 3.
Figure 5:
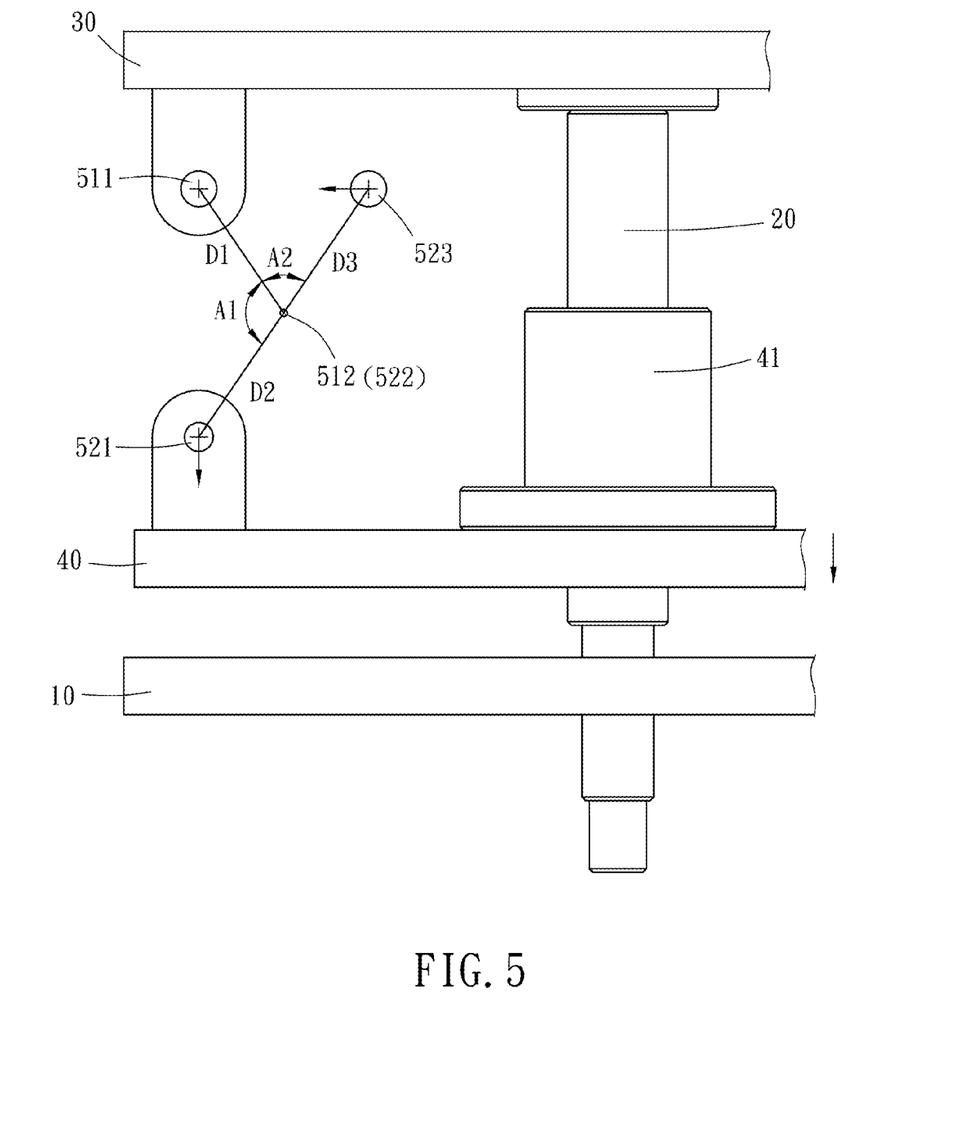
FIG. 5 is a schematic structural drawing of the embodiment of the present invention, showing that the first included angle is greater than the second included angle.
Figure 6:
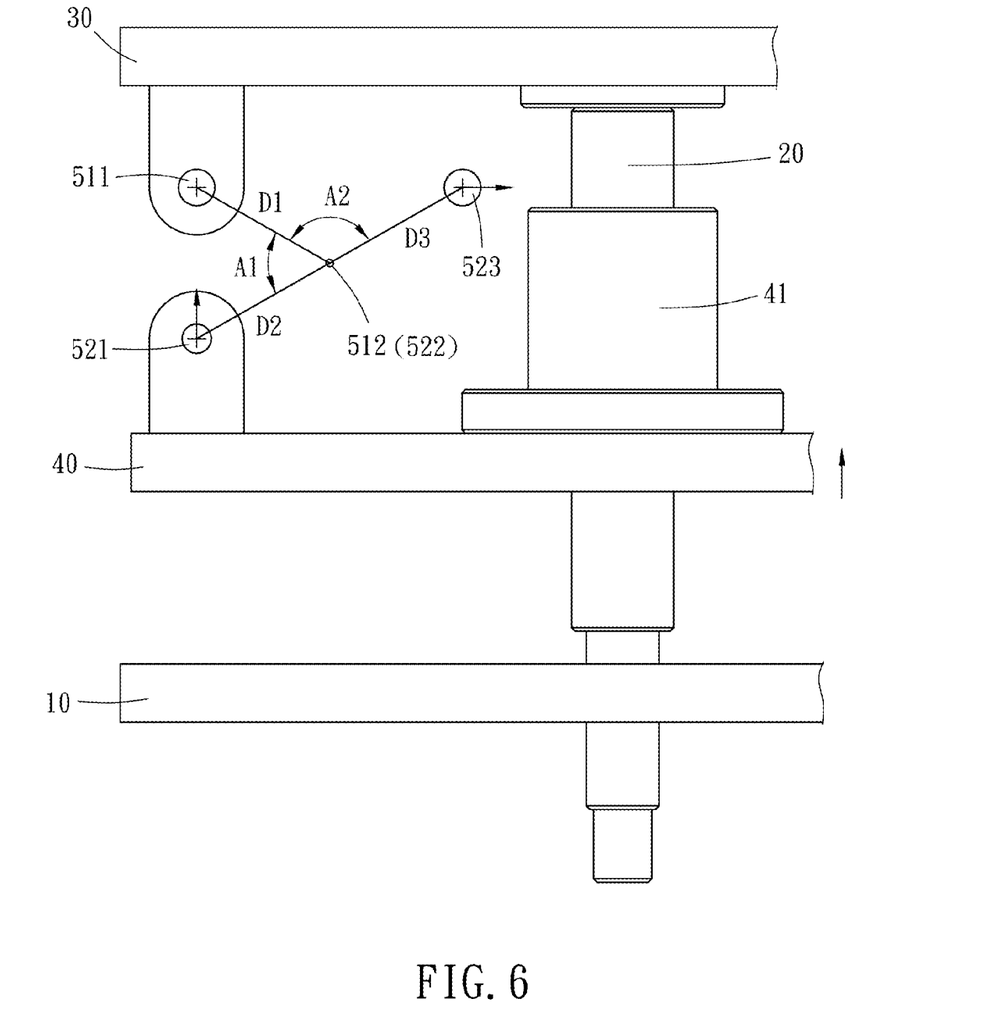
FIG. 6 is another schematic structural drawing of the embodiment of the present invention, showing that first included angle is smaller than the second included angle.
Figure 7:
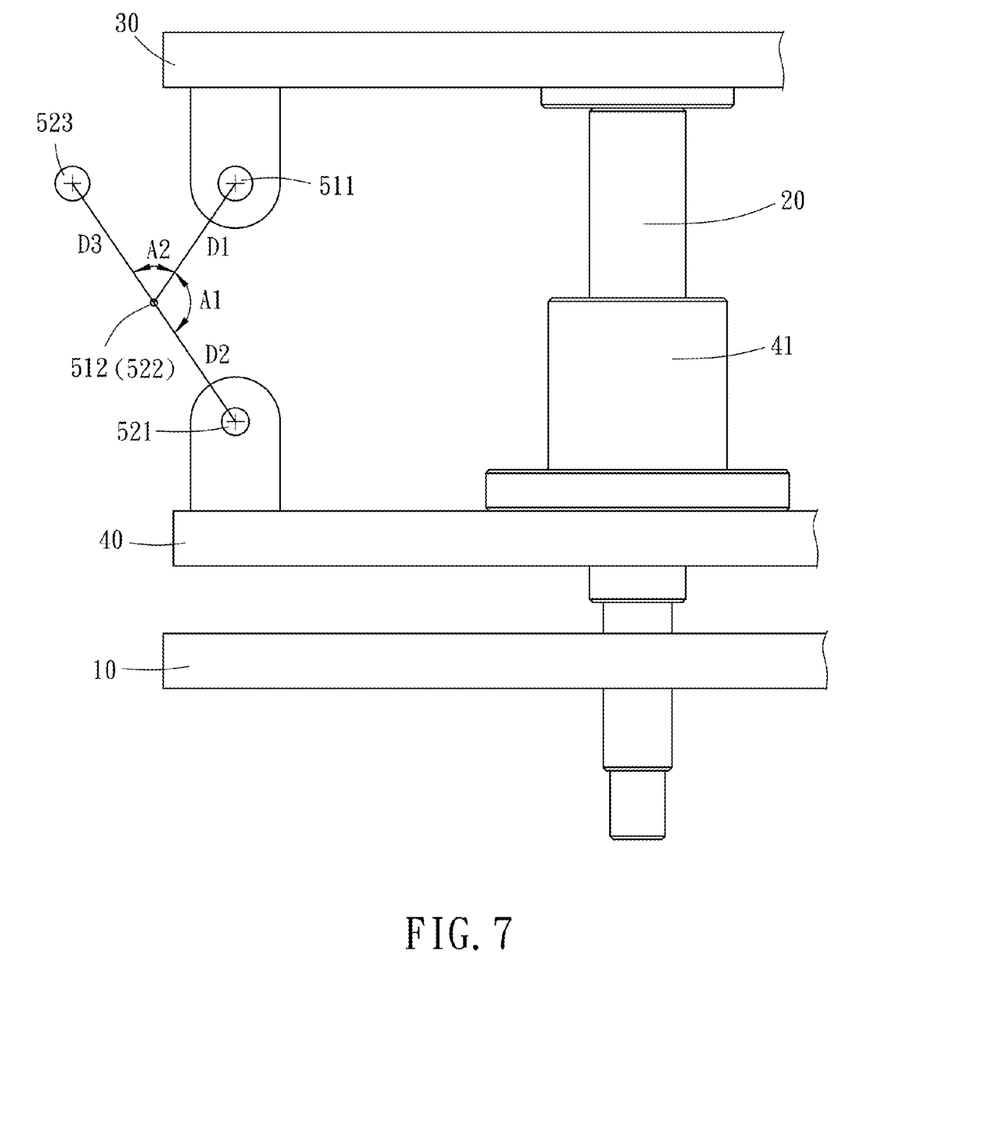
FIG. 7 is another schematic structural drawing of the embodiment of the present invention, showing the layout of the linkages.
Figure 8:
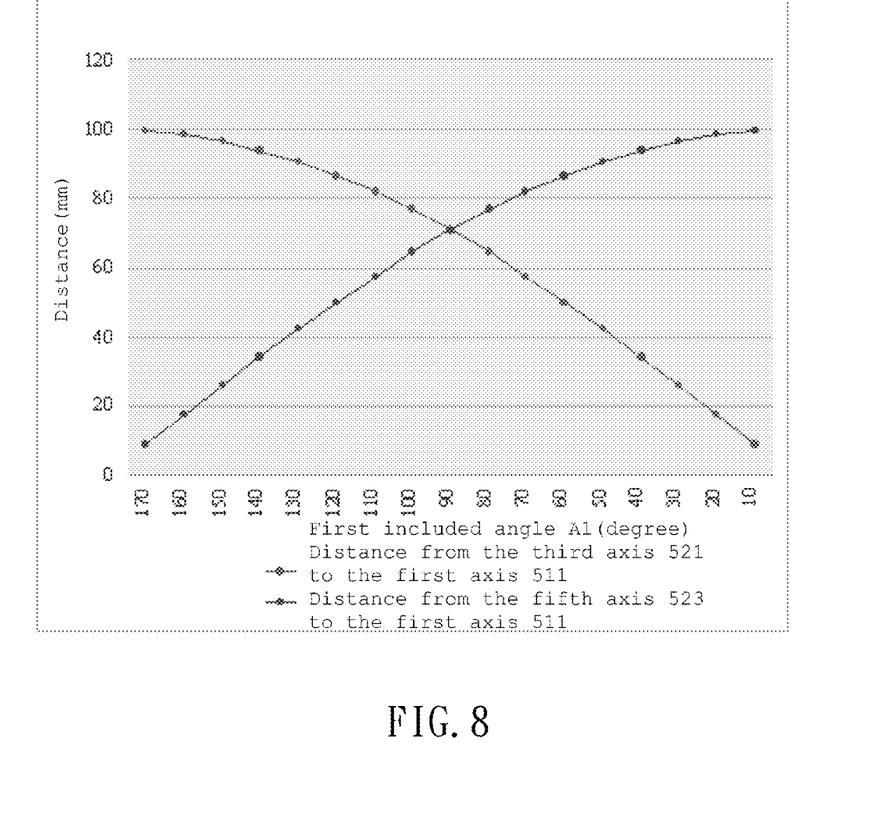
FIG. 8 is a curve graph obtained by testing the embodiment of the present invention with the first distance, the second distance and the third distance each being 100 mm.

It is to be noted that, in the embodiment, the first axis 511 to the fifth axis 523 are substantially parallel to each other. The first axis 511, the second axis 512, and the third axis 521 form a first included angle A1. The first axis 511, the second axis 512, and the fifth axis 523 form a second included angle A2. IF the first included angle A1 and the second included angle A2 are supplementary, we confirm that the third axis 521, the fourth axis 522, and the fifth axis 523 of the second link 52 is at the same plane.

Moreover, to make the fifth axis 523 move in the redial direction of the screw 20, it is necessary that the first axis 511 and the second axis 512 are spaced by a first distance D1, and the third axis 521 and the fourth axis 522 are spaced by a second distance D2, while the fourth axis 522 and the fifth axis 523 are spaced by a third distance D3, wherein the first distance D1, the second distance D2, and the third distance D3 are equal to each other.

Furthermore, when the first included angle A1 is smaller than the second included angle A2, the average velocity at which the third axis 521 moves in the axial direction of the screw 20 is smaller than the average velocity at which the fifth axis 523 moves in the redial direction of the screw 20, so that the fifth axis 523 can move fast, and the force received by the second link 52 at the third axis 521 can be amplified and applied to the fifth axis 523.

At last, when the first included angle A1 is greater than the second included angle A2, the average velocity at which the third axis 521 moves in the axial direction of the screw 20 is greater than the average velocity at which the fifth axis 523 moves in the redial direction of the screw 20.

The disclosed device operates as below.

1. When the driving board 40 moves toward the first board 10, the first link 51 pivot on the first axis 511 toward the third axis 521, so the first included angle A1 is increased, and the second included angle A2 is decreased. When the first included angle A1 is greater than the second included angle A2, the average velocity at which the third axis 521 moves in the axial direction of the screw 20 is greater than the average velocity at which the fifth axis 523 moves in the redial direction of the screw 20.

2. When the driving board 40 moves toward the second board 30, the first link 51 pivots on the first axis 511 toward the fifth axis 523, so the first included angle A1 is decreased and the second included angle A2 is increased. When the first included angle A1 is smaller than the second included angle A2, the average velocity at which the third axis 521 moves in the axial direction of the screw 20 is smaller than the average velocity at which the fifth axis 523 moves in the redial direction of the screw 20. Thereby, the fifth axis 523 can move fast, and the force received by the second link 52 at the third axis 521 can be amplified and applied to the fifth axis 523.

Besides, in the foregoing embodiment, the fifth axis of the second link moves between the screw and the first axis. Also, as shown in FIG. 6, the first axis may be located between the fifth axis of the second link and the screw.

What is claimed is:

1. A device for driving mechanical gripping jaws, the device comprising:
   a first board;
   a screw, having a first segment and a second segment, wherein the first segment is connected to the first board;
   a second board, being connected to the second segment and having a plurality of slots;
   a driving board, having a nut portion that is mounted around the screw and when driven by the screw drives the nut portion to move;
   a plurality of linkages, each having: a first link whose two ends are defined with a first axis and a second axis, respectively, wherein the first link is pivotally connected to the second board at the first axis; and a second link, being defined with a third axis, a fourth axis, and a fifth axis, wherein the second link is pivotally connected to the driving board at the third axis, and the second link is pivotally connected to the second axis of the first link at the fourth axis;
   a plurality of connecting boards, each being pivotally connected to the second link at the fifth axis and correspondingly passing through the corresponding slot; and
   a plurality of linear movement modules, each having a slide rail and a slider, wherein the slide rails are distributed over the second board in radial directions of the screw, and the slider is mounted on the slide rail to be limited to move along the slide rail and is connected to the connecting board.

2. The device of claim 1, wherein the first axis, the second axis the third axis form a first included angle; and the first axis, the second axis and the fifth axis form a second included angle; in which the first included angle and the second included angle are supplementary.

3. The device of claim 2, wherein the first axis and the second axis are spaced by a first distance, and the third axis and the fourth axis are spaced by a second distance, while the fourth axis and the fifth axis are spaced by a third distance, in which the first distance, second distance and the third distance are equal to each other.

4. The device of claim 3, wherein when the first included angle is smaller than the second included angle, an average velocity at which the third axis moves in an axial direction of the screw is smaller than an average velocity at which the fifth axis moves in the radial direction of the screw.

5. The device of claim 3, wherein when the first included angle is greater than the second included angle, an average velocity at which the third axis moves in an axial direction of the screw is greater than an average velocity at which the fifth axis moves in the radial direction of the screw.

6. The device of claim 1, wherein the first axis is located between the fifth axis of the second link and the screw.

* * * * *